March 1, 1955     F. C. CANTWELL     2,703,101
VACUUM CONTROL DEVICE
Filed May 20, 1950
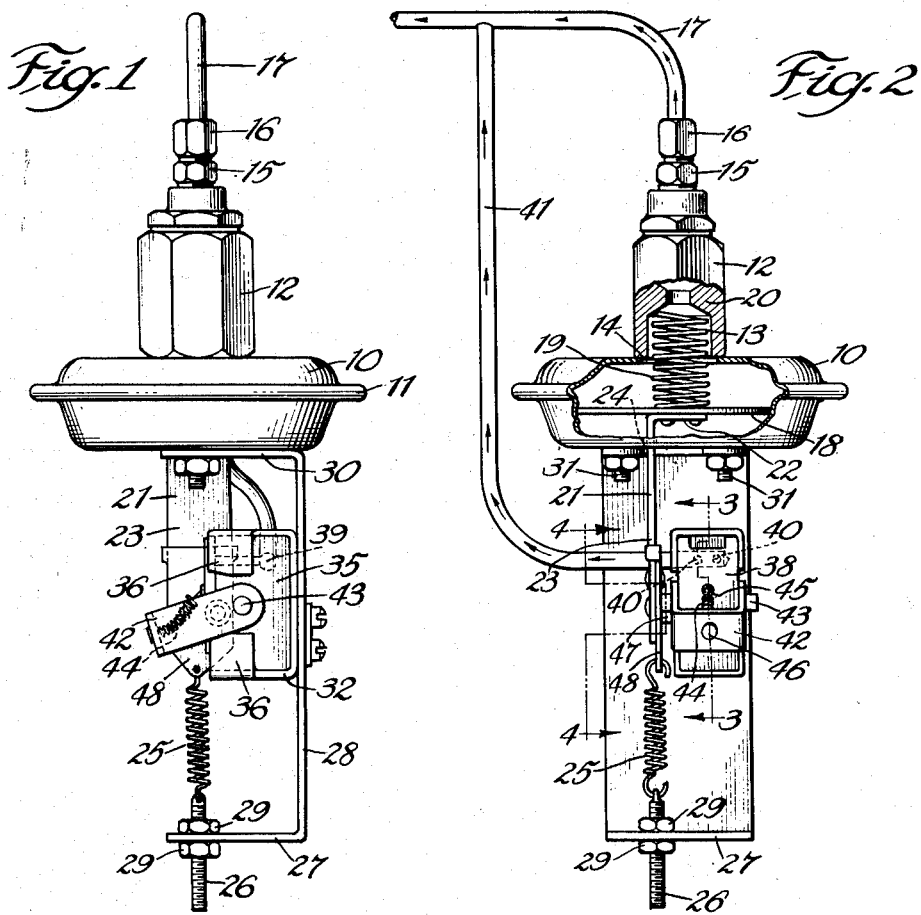
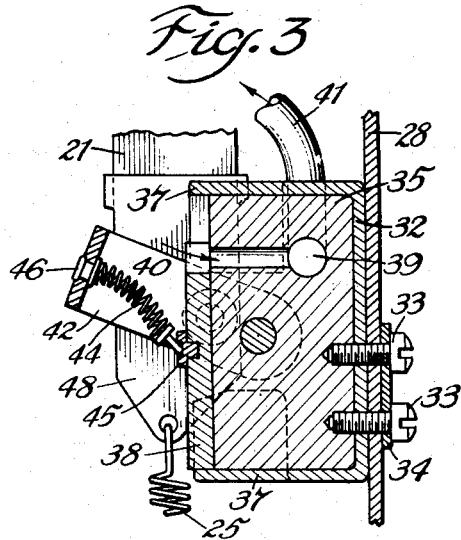
Inventor
Fred C. Cantwell
By John F. Brezina
Atty.

United States Patent Office 2,703,101
Patented Mar. 1, 1955

2,703,101

VACUUM CONTROL DEVICE

Fred C. Cantwell, Berwyn, Ill.

Application May 20, 1950, Serial No. 163,187

2 Claims. (Cl. 137—480)

My invention relates to a novel vacuum control device and more specifically to a lever operated valve for reducing the high vacuum in engines and the like.

One of the major factors which is responsible for the burning of excessive lubricating oil in engines and especially those of a construction similar to automobile engines is the result of the continuation of the high vacuum in the combustion chamber after the accelerator pedal has been released to slow the speed of the engine. Such continuation of high vacuum not being able to draw sufficient gasoline from the carburetor during de-acceleration to dissipate the vacuum, exerts its force in drawing lubricating oil from around the pistons.

Prior to my invention, although many attempts have been made to construct devices for eliminating excessive oil consumption, no device has been constructed or conceived which employs the same principle as mine for solving the problem. It is an object of my invention to provide a vacuum control device, including a valve, and which is operable by the force of the vacuum to permit air to enter into the combustion chamber to dissipate the vacuum. It is further an object of my invention to provide a device which includes a diaphragm-operated lever operable as a result of the amount of vacuum and which moves a sliding valve to appropriately permit or block the passage of air into the engine. It is further an object of my invention to provide a vacuum control device for controlling the amount of vacuum in an engine which may be easily connected to the vacuum line of an automobile or the like and which may be easily and quickly mounted under the hood of an automobile on any suitable stationary element. It is further an object of my invention to provide a lever-operated valve operable as a result of the amount of vacuum and which includes spring means for allowing movement of the valve only when a predetermined degree of vacuum is reached to thereby permit uncovering or closure of the valve ports with the resultant passing or blocking of air.

Other and further objects of my invention will become apparent from the following description and appended claims, reference being had to the accompanying drawings and numerals of reference thereon.

On the drawings:

Fig. 1 is an elevational view of my device looking at what may be called the front.

Fig. 2 is an elevational view of my device looking at the right of Fig. 1, parts being broken away for the purpose of illustration.

Fig. 3 is an enlarged view taken substantially on the line 3—3 of Fig. 2 and looking in the direction of the arrows.

Fig. 4 is an enlarged view taken substantially on the line 4—4 of Fig. 2 and looking in the direction of the arrows.

Referring to the drawings, it will be seen that numeral 10 designates a standard type of diaphragm housing or casing which is commercially available on the open market and which has an outwardly extending annular flange 11 where the upper half of the casing 10 and the lower half of said casing are connected together in a manner not shown. A passaged fitting or its equivalent 12 is secured to the top of the housing 10 in any appropriate manner so that the passage 13 thereof registers with an opening 14 in one wall of the casing 10. The fitting 12 is internally threaded and a bushing 15 is mounted in the end of said fitting. Numeral 16 designates an externally threaded reducer which is threaded onto the bushing 15 and which is secured in an air-tight seal on the end of the pipe or conduit 17 which is communicatively connected to the vacuum source (not shown). It will be understood that I have thereby provided a continuous closed and hermetically sealed path from the vacuum source to the interior of the housing 10.

As illustrated in Fig. 2, a suitable flexible diaphragm or plate 18 is suitably secured and extends transversely in the housing 10 dividing into upper and lower chambers which are substantially hermetically isolated from each other. I have mounted a compression spring 19 so that a portion thereof abuts against flange 20 of fitting 12, and the other portion thereof is in abutment with the diaphragm or flexible plate 18. Spring 19 tends to retain the diaphragm 18 in lowered position with respect to Fig. 2.

Numeral 21 designates an L-shaped arm or bracket which has its normally upper shorter end 22 secured to the diaphragm 18 in any appropriate manner and whose preferably longer arm 23 extends through a normally lower opening 24 in casing 10. At one end the arm 21 has an apertured outwardly extending ear 48 on which is mounted one end of a tension spring 25. The opposite end of the tension spring 25 is connected to a screw or the like 26 which is adjustably mounted in the apertured flange 27 of the bracket 28 (to be hereinafter described) by means of opposed lock nuts 29. It will therefore be understood that the tension on spring 25 may be suitably adjusted as desired.

Numeral 28 designates an elongated normally vertically extending bracket which may have a bifurcated and bent upper end 30. The bifurcated end 30 is apertured and internally threaded and a pair of screws or bolts or the like 31 extends through appropriate apertures in the end 30 of bracket 28 to secure bracket 28 to casing 10 as illustrated in Figs. 1 and 2.

Numeral 32 designates a frame or bracket which is suitably secured to the bracket 28 by means such as screws or the like 33, and numeral 34 designates a plate or washer which is interposed between the head screw 33 and the bracket 28 as illustrated in Figs. 3 and 4. A passaged block 35 is securely mounted in the bracket or frame 32, being partially retained by the action of screws 33 and partially retained by action of the bosses or ears 36 which are integral with and extend inwardly of the bracket or frame 32. The frame or bracket 32 extends outwardly and beyond the block 35 as illustrated at 37 and the extensions 37 provide an abutment for the sliding valve plate 38 which is slidably mounted against one end of block 35.

Numeral 39 designates a path or conduit in the block 35 which is communicatively connected to the atmosphere by one or more openings or ports 40 which are uncovered to permit the entrance of air into the passage 39 when the valve plate 38 is in lowered position with respect to Figs. 1, 2 and 3. At its other end the conduit or path 39 is communicatively connected to a tube or conduit 41 which is secured to block 35 to provide an air-tight seal. The conduit 41 extends upwardly with respect to Figs. 2, 3 and 4 and at one end is communicatively connected in an air-tight seal to the conduit or pipe 17.

A U-shaped lever or bracket 42 is pivoted, and is shown as such, on an intermediate portion of the block 35 in Figs. 1, 2, 3 and 4. Such pivoting of bracket 42 is by means of a pin or its equivalent 43, seen in Figs. 1, 2 and 4. A compression spring 44 is operably connected at one end thereof to the valve plate 38 by means of a screw, stud or anchoring pin or the like 45 as illustrated in Figs. 1 and 3. At its other end the spring 44 is connected to the bracket 42 by means of a stud, anchoring pin or the like 46, as illustrated in Figs. 1 and 3.

The lever or bracket 42 carries a pin or lug 47 which is connected to the arm 23 of bracket 21 so that when the bracket 21 moves downwardly bracket or lever 42 will also move downwardly and when the bracket 21 moves upwardly the lever 42 will also move upwardly.

The mode of operation of my novel device employed in a preferred use is as follows:

By any suitable means the entire device may be appropriately supported from any permanent fixture under the hood of an automobile. One end of the conduit or pipe 17 is communicatively connected to the vacuum line which is communicated with the combustion chamber of the engine. As vacuum is developed in the conduit 17 such vacuum acts to actuate the diaphragm 18 to move upwardly. The upward movement of the diaphragm 18 causes movement of the arm 21 to thereby cause resultant upward movement with respect to the drawings of bracket 42. As the bracket or lever 42 moves upwardly, a force is developed by virtue of the spring 44 which force when of sufficient magnitude will cause the valve plate 38 to rapidly move downwardly with respect to the drawings to thereby uncover ports 40 and permit entrance of air into the block 35 thence through the conduit 41 and into the engine to diminish the vacuum force to the required and desired amount, it being understood that a certain amount of vacuum is necessary for idling of the engine.

By virtue of the toggle action resulting from the cooperation of the bracket 42 and spring 44 I am able to uncover the ports 40 at a different magnitude of vacuum than is necessary to close the port.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a vacuum control device, a housing, a diaphragm in said housing and providing upper and lower chambers, each of said chambers being hermetically isolated from the other, said upper chamber being connected to a vacuum source; an arm connected at one end thereof to said diaphragm and extending through the lower of said chambers; bracket means secured to said housing and providing extensions; a block secured to said bracket means and having a passage communicatively connected with the atmosphere, means communicatively connecting said passage to said upper chamber; a valve element slidable on a face of said block to cover or uncover said block passage and being limited in its movement by said extensions; a toggle spring means pivoted on said block and connected to said valve element and movable by said arm.

2. In a device substantially as set forth in claim 1, in which said means communicatively connecting said passage to said upper chamber includes a conduit having one end connected to said block and its opposite end connected to and in communication with said vacuum source.

References Cited in the file of this patent

UNITED STATES PATENTS

| | | |
|---|---|---|
| 380,941 | Schutte | Apr. 10, 1888 |
| 971,099 | Youngs | Sept. 27, 1910 |
| 1,020,284 | James | Mar. 12, 1912 |
| 1,215,381 | Kemp | Feb. 13, 1917 |
| 1,324,284 | Todd | Dec. 9, 1919 |
| 1,703,531 | Hyde | Feb. 26, 1929 |
| 1,753,536 | Scovel | Apr. 8, 1930 |
| 1,764,193 | Bruehl | June 17, 1930 |
| 2,075,959 | Previti | Apr. 6, 1937 |
| 2,103,118 | Petroe | Dec. 21, 1937 |

FOREIGN PATENTS

| | | |
|---|---|---|
| 18,555 | Great Britain | Aug. 15, 1913 |